M. C. SCHWEINERT & H. P. KRAFT.
LOCKING CAP FOR TIRE VALVES AND THE LIKE.
APPLICATION FILED JAN. 22, 1907.
1,027,508.
Patented May 28, 1912.
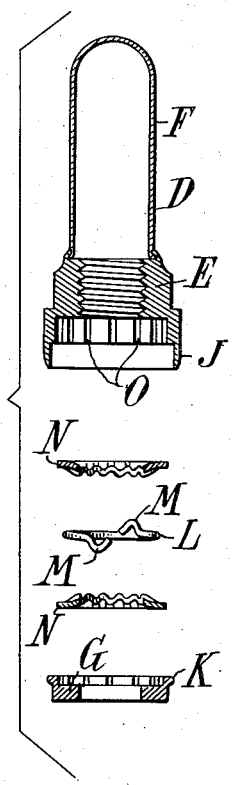
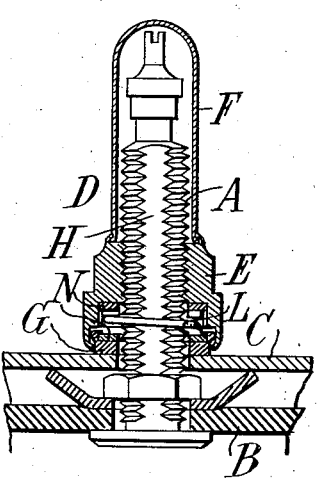
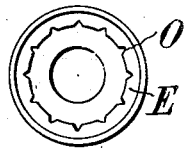
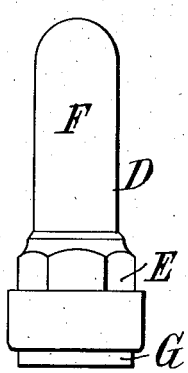
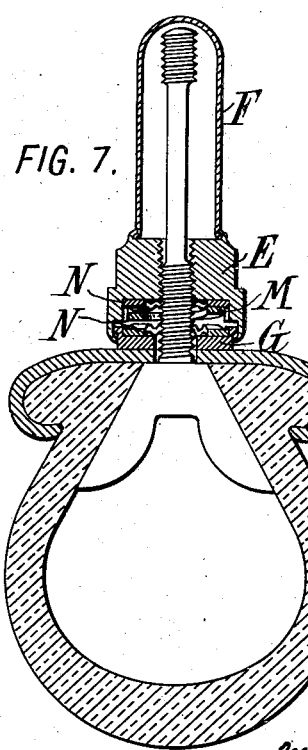
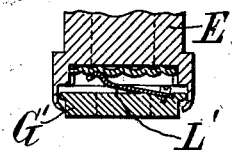
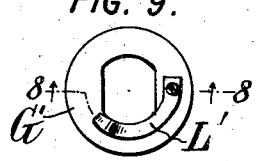
WITNESSES:
Fred White
René Muine
INVENTORS:
Maximilian Charles Schweinert
and Henry P. Kraft
By Attorneys,
Arthur E. Fraser Muina

UNITED STATES PATENT OFFICE.

MAXIMILIAN CHARLES SCHWEINERT, OF WEST HOBOKEN, NEW JERSEY, AND HENRY P. KRAFT, OF NEW YORK, N. Y.

LOCKING-CAP FOR TIRE-VALVES AND THE LIKE.

1,027,508.  Specification of Letters Patent.  Patented May 28, 1912.

Application filed January 22, 1907. Serial No. 353,544.

*To all whom it may concern:*

Be it known that we, MAXIMILIAN CHARLES SCHWEINERT, residing in West Hoboken, in the county of Hudson and State of New Jersey, and HENRY P. KRAFT, residing in the borough of Brooklyn, in the county of Kings, city and State of New York, both citizens of the United States, have jointly invented certain new and useful Improvements in Locking-Cap for Tire-Valves and the Like, of which the following is a specification.

This invention relates to caps which are adapted to be screwed upon automobile tire valves, stay bolts or the like, in which means are employed for retaining or locking the cap in place. In some of its features, however, our invention is applicable to lock nuts and similar devices.

In the drawings illustrating our invention, Figure 1 is a view of our invention applied to an automobile tire valve, the valve being shown in elevation and the cap in section; Fig. 2 is a view illustrating various parts of our improved cap before assembling, such parts with the exception of the spring being shown in vertical section; Fig. 3 is a bottom view of the cap proper; Fig. 4 is a plan of one of the corrugated disks; Fig. 5 is a plan of the washer which is attached to the lower part of the cap proper; Fig. 6 is an elevation of the complete cap, and Fig. 7 is a view illustrating the application of our improved cap to a stay bolt for pneumatic tires, the tire being shown in cross-section. Fig. 8 is a section of a modification, taken on a line indicated at 8—8 on the washer, Fig. 9. Fig. 9 is a plan of the washer of Fig. 8.

Referring to Figs. 1 to 6 of the drawings let A indicate a pneumatic tire valve of common construction which is connected with the tire B and extends through the rim C.

D indicates the cap as a whole which is provided with internal screw-threads adapted to engage the outer wall of the valve to hold the latter against inward movement and to protect it from dust, injury, etc.

In the construction shown the cap comprises a nut E having fixed to its upper end a sheet metal cap F which is provided with an outwardly extending flange at its lower end engaged by an inwardly extending flange upon the nut. The nut E has swiveled to its lower end a washer G, which is designed to press against the rim C and to be held against rotation either by its frictional contact with the rim or by engagement with a flat wall H formed upon the valve. In the latter case the washer is formed on its interior with one or more straight faces I as shown in Fig. 5. According to our invention the nut is bored on its lower side to form a flange J, (Fig. 2) and the washer is formed with an outwardly extending flange K over which the flange J is bent when the parts are assembled. This construction provides an exceedingly simple and cheap method of swiveling the parts together and allows the requisite amount of telescoping of the parts.

The nut and washer are provided with opposing recesses which are designed to inclose a spring L (Fig. 2) in the form of a single coil of a helix and provided with oppositely extending projections M adapted to enter a series of recesses or notches in the nut and washer so that when the cap is screwed home its reverse rotation will be sufficiently resisted to prevent accidental unscrewing of the cap proper.

We have found in practice that it is with great difficulty that the nut E and washer G can be formed with the notches or undulations necessary in this type of cap. An extremely heavy pressure is required to swage the heavy metal of which these parts are formed. One of the objects of our present invention is to avoid this disadvantage and materially cheapen the cost of construction. To this end we form the notches or depressions upon separate plates N, N which are afterward fixed within the recesses of the nut and washer. Preferably the plates N, N are in the form of corrugated annular disks, which can be stamped out of sheet metal in one operation. The best mode of constructing and applying the disks to the parts is that illustrated in Figs. 3, 4 and 5. The walls of the cap and washer surrounding the opposing recesses are provided with a series of notches O, O, the entire series preferably being made with a single drifting tool in one operation. The disk N is formed with a series of projections or points P (Fig. 4) which correspond in number with the notches O, and is somewhat cupped or concaved as shown in Fig. 2. In assembling the parts the disk is placed in the nut or washer with its points within the indentations O and is pressed downwardly by a suitable tool so that it is flattened and rigidly engages the nut or washer. Of course it will be understood that any other means of attaching the disks may be employed.

The disk applied to the nut is, of course, adapted to rotate therewith, and its opening is so proportioned that any diameter thereof is greater than the bore of the nut, so that it does not non-rotatively engage the bolt.

In Fig. 7 we have illustrated our invention as applied to a stay bolt for pneumatic tires. In construction it does not differ materially from that shown in Fig. 1, the principal difference being that the nut and washer are provided with bores of smaller diameter so as to engage the smaller bolt. The latter may be provided with a flat face such as H (Fig. 1) if desired.

In Figs. 8 and 9 we have illustrated a modification of our invention. In these figures but one disk N is used, and the spring L is replaced by a short spring L' which is fixed at its end to one of the parts. As shown, the disk is connected to the nut E in the same manner as in Fig. 1, while the spring L' is united to the washer G' by a screw. Obviously this arrangement may be reversed.

While we have illustrated our invention as applied to a cap for stay bolts, valves, etc., it will be understood that it is susceptible of use in other connections, such as lock nuts or the like. It will also be understood that we do not wish to be restricted to the constructions shown as these may be varied considerably without departing from the invention.

What we claim is:—

1. A nut having a recess, and a sheet metal disk in said recess, said disk being notched or corrugated.

2. The combination of a nut, a part swiveled thereto, said parts having a recess formed between them and a notched disk in said recess, and resilient engaging means interposed between said nut and swiveled part.

3. The combination of a nut, a part swiveled thereto, said parts having a recess formed between them and a notched disk in said recess, said disk being adapted to engage one of said parts, and a spring adapted to be connected with the other of said parts and to engage said disk.

4. The combination of a nut, a washer, and a spring interposed between them, said nut and washer having opposing notched faces adapted to be engaged by said spring, said faces being formed on corrugated sheet metal disks.

5. A nut or the like having a recess, the walls of which are formed with a series of notches, and a corrugated disk within said recess having projections entering said notches, said disk being adapted to rotate with the nut and having an opening any diameter of which equals that of the bore of the nut.

6. A nut or the like having swiveled thereto a washer, said parts being formed with opposing recesses, a spring within said recesses and a corrugated disk between said nut and washer and fixed to one of said parts and adapted to be engaged by said spring.

7. A nut having at one end a washer connected thereto and swiveled thereon, said nut and washer having a series of notches, and a spring between said nut and washer adapted to engage such notches, said nut having fixed to its other end a sheet metal cap portion adapted to fit over the protruding end of a bolt or the like.

8. A cap for stay bolts, tire valves or the like adapted to inclose substantially the whole of the projecting portion of such member, said cap being screw-threaded on its inner end to screw upon said member, a washer swiveled to said cap, said cap and washer being recessed, a spring within said recess, and corrugated sheet metal disks fixed to said cap and washer respectively and adapted to be engaged by said spring.

9. A nut having a washer swiveled thereto, said nut being recessed on its lower side to form a substantially unbroken circular flange J, and said washer fitting within said recess and having an outwardly extending flange K, said flange J being bent over said flange K to swivel the parts together, the lower face of said washer extending beyond the lower face of the nut.

10. The combination of two parts, one of which is screw threaded, and the other of which is adapted to hold the first in place, one of said parts having a recess and a notched or corrugated face, such face being formed upon a separately formed member connected to such part within said recess, and a spring engaging said corrugations.

11. The combination of a nut and a washer, one of which has a recess and a notched or corrugated face within said recess, such face being formed upon a corrugated metal disk, and a spring engaging said corrugations.

12. The combination of a nut, a part swiveled thereto, said parts each having a recess, a corrugated disk in each of said recesses, and a spring in said recesses and adapted to engage both said disks.

In witness whereof, we have hereunto signed our names in the presence of two subscribing witnesses.

MAXIMILIAN CHARLES SCHWEINERT.
HENRY P. KRAFT.

Witnesses:
EUGENE V. MYERS,
THEODORE T. SNELL.